(12) United States Patent
Tikhonov

(10) Patent No.: US 9,332,029 B1
(45) Date of Patent: May 3, 2016

(54) SYSTEM AND METHOD FOR MALWARE DETECTION IN A DISTRIBUTED NETWORK OF COMPUTER NODES

(71) Applicant: Kaspersky Lab ZAO, Moscow (RU)

(72) Inventor: Andrey G. Tikhonov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/582,289

(22) Filed: Dec. 24, 2014

(51) Int. Cl.
*H04L 29/06* (2006.01)
*G06F 21/56* (2013.01)

(52) U.S. Cl.
CPC ............ *H04L 63/145* (2013.01); *G06F 21/566* (2013.01)

(58) Field of Classification Search
CPC .. G06F 21/566; H04L 12/2818; H04L 63/145
USPC .......................................................... 726/24
See application file for complete search history.

(56) References Cited

U.S. PATENT DOCUMENTS

| | | | |
|---|---|---|---|
| 6,728,886 B1 | 4/2004 | Ji et al. | |
| 7,899,849 B2 | 3/2011 | Chaudhry et al. | |
| 8,484,347 B1 * | 7/2013 | Gostev ................... | H04L 63/145 709/225 |
| 8,613,095 B2 | 12/2013 | Jung et al. | |
| 8,640,242 B2 * | 1/2014 | Kulkarni ............... | G06F 21/554 726/22 |
| 2006/0015941 A1 * | 1/2006 | McKenna ....................... | 726/23 |
| 2006/0212932 A1 * | 9/2006 | Patrick et al. .................... | 726/11 |
| 2007/0289019 A1 * | 12/2007 | Lowrey ............................ | 726/24 |
| 2009/0044024 A1 * | 2/2009 | Oberheide ............ | G06F 21/562 713/188 |
| 2012/0317644 A1 * | 12/2012 | Kumar et al. .................... | 726/24 |
| 2013/0061325 A1 | 3/2013 | Singh et al. | |
| 2013/0145469 A1 * | 6/2013 | Kulkarni ............... | G06F 21/554 726/24 |
| 2013/0276114 A1 * | 10/2013 | Friedrichs ............... | G06F 21/56 726/23 |
| 2014/0143869 A1 * | 5/2014 | Pereira .................. | G06F 21/566 726/23 |
| 2014/0289853 A1 * | 9/2014 | Teddy et al. ..................... | 726/23 |

* cited by examiner

*Primary Examiner* — Hadi Armouche
*Assistant Examiner* — Bryan Wright
(74) *Attorney, Agent, or Firm* — Arent Fox LLP; Michael Fainberg

(57) ABSTRACT

Disclosed are system and method of distributed detection of malware. An example system includes a security client deployed on a computer node. The security client is operable to identify and communicate with similar security clients deployed on other computer nodes located in a local or remote computer networks. The security client is configured to: perform a malware analysis of files on the computer node; identify unknown files; collect information and statistics data about the unknown file; transmit to other computer nodes a request for identification about the unknown file; receive from at least one other computer node a response containing the identification of the unknown file as a malicious file and a malware remediation tool, wherein the remediation tool includes information, statistics data and malware repair or removal instructions for the malicious file; and use the received malware remediation tool to repair or remove the malicious file.

21 Claims, 9 Drawing Sheets

SYSTEM AND METHOD FOR MALWARE DETECTION IN A DISTRIBUTED NETWORK OF COMPUTER NODES

TECHNICAL FIELD

The disclosure relates generally to the field of computer security and, more specifically, to systems and methods for distributed detection of malware.

BACKGROUND

The popularity of computer and network technologies has been rapidly growing for the past two decades; however, it has been accompanied by a steady growth in cybercrime, which ranges from relatively harmless cases, such as distribution of unsolicited e-mail, commonly known as spam, to more serious cases of cybercrimes, such as denial of service attacks, stealing of confidential financial information, and even cyber warfare and terrorism. It has become obvious that it is imperative to aggressively combat cybercrime. And, one of the most commonly used means for protecting computers from cyber attacks is antivirus software.

Antivirus software is typically deployed on personal computers, network firewalls, mobile devices and is used to analyze Internet traffic, downloaded files and other digital content for presence of malware, such as viruses, worms and Trojans, spam and cyber attacks. However, since hundreds of new types and variation of malware emerge daily worldwide and spread globally within hours through the Internet, the antivirus software needs to have most current information about known malware in order to be able to combat spread of malware.

Currently, an antivirus industry uses centralized means for distribution of information about known malware. For example, most antivirus companies maintain central antivirus servers that contain information about known malware and periodically distribute this information to antivirus software deployed on computers throughout the world. However, this centralized malware information distribution mechanism often fails to keep up with the speed of emergence and spread of new types of malware and, as a result, more and more computers are getting infected by malware that was undetected my antivirus software deployed on these computers. Therefore, there is a need to improve the mechanism for distribution of malware related information between antivirus software deployed on personal computers.

SUMMARY

As the processing power of personal computers, network firewalls, and mobile user devices, such as laptops, tablets, smart phones, etc. (all of which will be commonly referred herein as computer nodes) keeps growing and the bandwidth of wired and wireless networks keeps increasing, the centralized mechanism of distribution of malware related information may be supplemented or even completely replaced by a distributed mechanism of malware detection in which multiple computer nodes, located in the same local or remote computer networks, and having security clients, such as antivirus software, deployed thereon, may directly communicate with each other to send and receive information about new malware with or without participation of a centralized antivirus server hosted by an antivirus company.

Disclosed are systems, methods and computer program products for distributed detection of malware. In one aspect, an example method includes deploying a security client on a first computer node, wherein the first security client is operable to identify and communicate with one or more second security clients deployed on one or more second computer nodes located in a local or remote computer network; performing, by the first security client, a malware analysis of files on the first computer node; identifying an unknown file that could not be determined as either malicious or clean; collecting, by the first security client, information and statistics data about the unknown file generated during malware analysis of the unknown file by the first security client; transmitting, by the first security client, to the one or more second computer nodes, a request for identification information and remediation tool for the unknown file; receiving from at least one second computer node a response containing the identification of the unknown file as a malicious file and a malware remediation tool for the identified malicious file, wherein the remediation tool includes information, statistics data and malware repair or removal instructions for the malicious file; and using, by the first security client, the received identification and malware remediation tool to repair or remove the malicious file from the first computer node.

In one example aspect, malware detection includes at least of the signature analysis, heuristic analysis, proactive analysis and emulation.

In one example aspect, transmitting a request for identification information and remediation tool for the unknown file, includes broadcasting or multicasting the request on the local or remote computer network.

In one example aspect, the method further comprises: detecting, by the first security client, a malicious file on the first computer node; collecting by the first security client information and statistics data about the malicious file generated during malware analyses of the file by the first security client; designating the collected information and statistic data as malicious; generating a remediation tool for repair or removal of the malicious file; storing the collected information, statistics data and remediation tool for the malicious file in a local malware database on the first computer node; transmitting the collected information, statistics data and remediation tool to one or more second computer nodes; and transmitting the collected information, statistics data and remediation tool to a remote security server.

In one example aspect, the method further comprises: receiving from a second security client deployed on a second computer node a request to provide identification and malware remediation tool for an unknown file; determining, by the first security client, whether information about the unknown file is stored in a local malware database on the first computer node; if the information about the unknown file is stored in the local malware database, sending a response to the second security client containing the identification of the unknown file as a malicious file and a malware remediation tool for the identified malicious file.

In one example aspect, the method further comprises: receiving from a second security client deployed on a second computer node information, statistics data and remediation tool for a malicious file; determining, by the first security client, if the received information about the malicious file is stored in a local malware database on the first computer node; if the information about the malicious file is not stored in the local malware database or the stored information about the malicious file is outdated, storing the collected information, statistics data and remediation tool for the malicious file in the local malware database; and transmitting the collected information, statistics data and remediation tool to one or more second security clients deployed on one or more second computer nodes.

In one example aspect, the method further comprises: determining, by the first security client, whether the requested identification and malware remediation tool have been received from any of the second computer nodes; and when the requested identification and malware remediation tool have not been received from any of the second computer nodes, transmitting to a remote security server a request for identification information and remediation tool for the malicious file.

In one example aspect, the method further comprises: determining, by the first security client, whether the malicious file has been repaired or removed using the received identification and malware remediation tool; when the malicious file has not been repaired or removed using the received identification and malware remediation tool, transmitting to a remote security server a request for identification information and remediation tool for the In one example aspect, the method further comprises: receiving from two or more second security clients deployed on two or more second computer nodes responses containing indications of the availability of requested information; selecting, by the first security client, out of the two or more second computer nodes one second computer node for obtaining the requested information; and requesting from the selected second computer node the identification information and remediation tool for the unknown file.

In one example aspect, selecting out of the two or more second computer nodes one second computer node for obtaining the requested information is based on the network proximity of the selected second computer node to the first computer node.

In another example aspect, selecting out of the two or more second computer nodes one second computer node for obtaining the requested information is based on the geographic proximity of the selected second computer node to the origin of appearance of the malicious file.

Yet in one example aspect, selecting out of the two or more second computer nodes one second computer node for obtaining the requested information is based on a bandwidth of a communication channel connecting the second computer node to a broadband network and computing power of the second computer node.

In one aspect, an example system of distributed detection of malware, comprises: a first computer node having hardware processor configured to execute a first security client, wherein the first security client is operable to identify and communicate with one or more second security clients deployed on one or more second computer nodes located in a local or remote computer network, and wherein the security client is configured to: perform a malware analysis of files on the first computer node; identify an unknown file that could not be determined as either malicious or clean; collect information and statistics data about the unknown file generated during malware analysis of the unknown file by the first security client; transmit to one or more second computer nodes a request for identification information and remediation tool for the unknown file; receive from at least one second computer node a response containing the identification of the unknown file as a malicious file and a malware remediation tool for the identified malicious file, wherein the remediation tool includes information, statistics data and malware repair or removal instructions for the malicious file; use the received identification and malware remediation tool to repair or remove the malicious file from the first computer node.

In one aspect, an example computer program product, stored on a non-transitory computer readable medium, includes computer executable instructions for distributed detection of malware, including instructions for deploying a security client on a first computer node, wherein the first security client is operable to identify and communicate with one or more second security clients deployed on one or more second computer nodes located in a local or remote computer network; performing, by the first security client, a malware analysis of files on the first computer node; identifying an unknown file that could not be determined as either malicious or clean; collecting, by the first security client, information and statistics data about the unknown file generated during malware analysis of the unknown file by the first security client; transmitting, by the first security client, to the one or more second computer nodes, a request for identification information and remediation tool for the unknown file; receiving from at least one second computer node a response containing the identification of the unknown file as a malicious file and a malware remediation tool for the identified malicious file, wherein the remediation tool includes information, statistics data and malware repair or removal instructions for the malicious file; and using, by the first security client, the received identification and malware remediation tool to repair or remove the malicious file from the first computer node.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects of the invention are described herein in the context of systems, methods and computer program products for distributed detection of malware. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
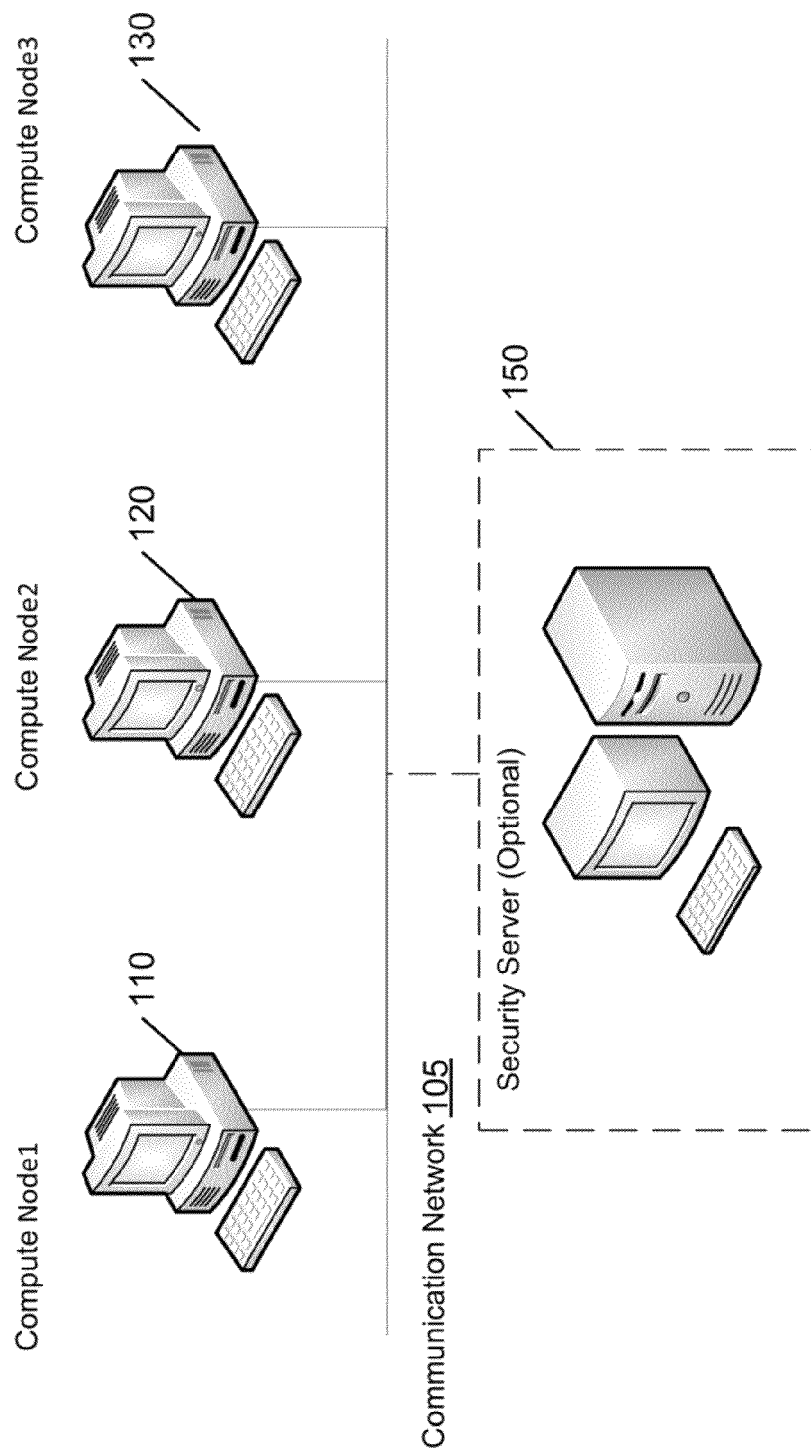
FIG. 1 shows a network diagram of a system for distributed detection of malware according to one example aspect of the invention.

FIG. 1 shows an example network diagram of a system for distributed detection of malware according to one example aspect of the invention. As show, the system for distributed detection of malware involves the interaction of multiple compute nodes 110-130 connected to the same local network or different remote networks 105. In this context, the computer node may include any computing device such as a personal computer, laptop, tablet, smartphone, firewall or server. An example configuration of a computer node will be described below with reference to FIG. 10. Each compute node has a security client installed thereon. In one example aspect, the security client may be an antivirus application that can perform malware detection on files downloaded or stored on the computer nodes, such as signature analysis, heuristic analysis, proactive detection, emulation and other known malware detection methods. In one example aspect, the computer nodes may be connected via a network 105 to a remote security server 150, which may be a central antivirus server hosted by an antivirus company that provided antivirus software deployed on computer nodes 110-130.

Figure 2:
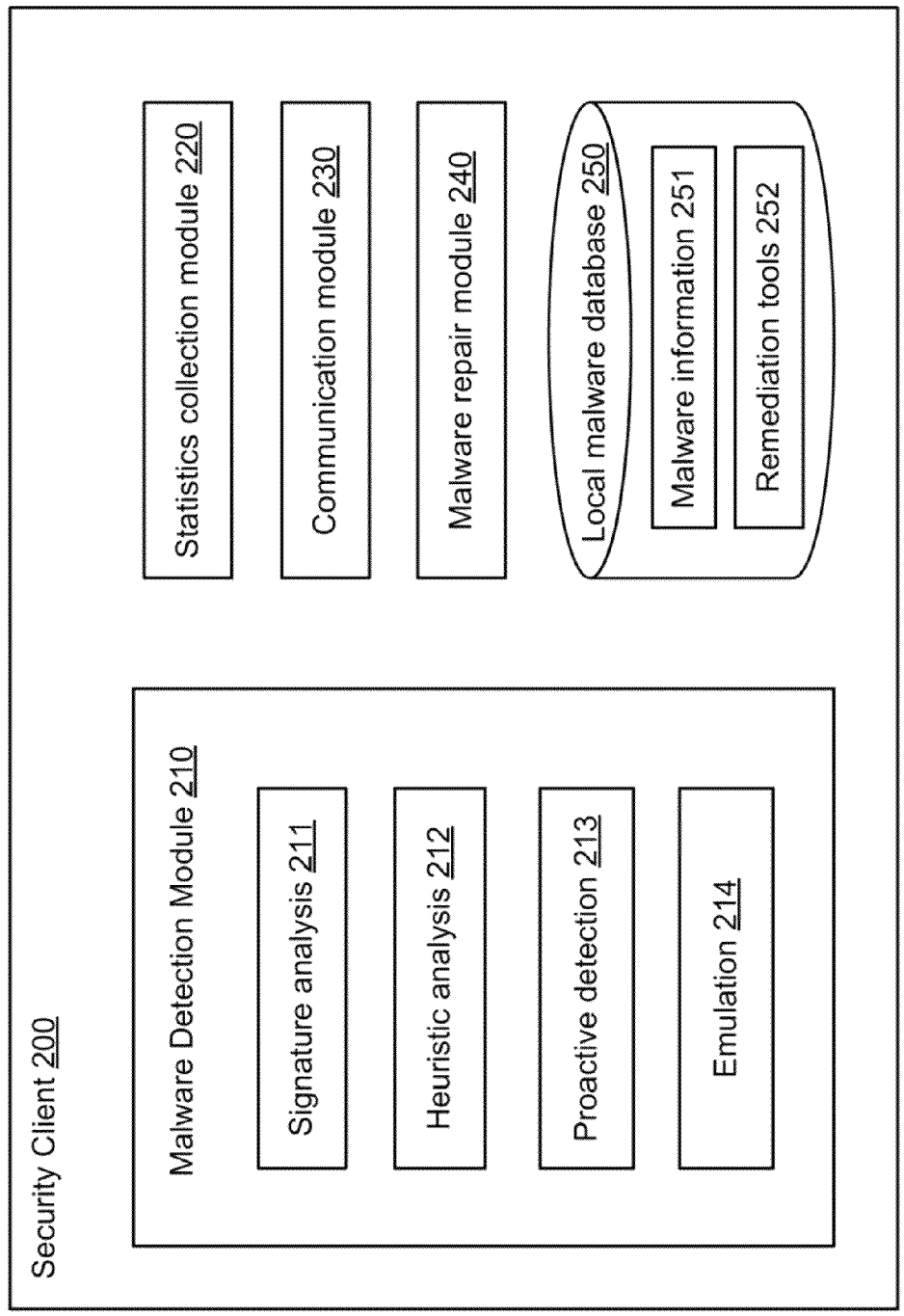
FIG. 2 shows an example configuration of a security client for distributed detection of malware according to one example aspect of the invention.

FIG. 2 shows an example configuration of a security client used for distributed detection of malware according to one example aspect of the invention. The security client 200 may be implemented as software provided by the security server 150, deployed (i.e., installed) on the computer nodes 110-130 and executed by the processor of the computer node. In one example aspect, the security client 200 may include an antivirus application. The security client 200 may include, but not limited to a malware detection module 210, statistics collection module 220, communication module 230, malware repair module 240 and local malware database 250, that contains malware information 251 and malware remediation tools 252.

In one example aspect, the malware detection module 210 may be configured to perform antivirus analysis of files downloaded or stored on the computer node (e.g., node 110) using one or more malware detection methods, including but not limited to signature analysis 211, heuristic analysis 212, proactive detection 213 and emulation 214. During antivirus analysis, malware detection module 210 scans a file using one or more malware detection methods using malware information 251 to determine if the file is clean or malicious. The malware information 251 may include statistics on various known malicious files, including but not limited to checksums of malicious files and their parts; logs of emulation and execution of malicious files (e.g., API calls of known malicious files); sources of malicious files (e.g., the process that created the file, and, if possible, URL of the source; a parent process that launched the malicious file; child processes; memory areas which were accessed by the file both in RAM and ROM; URLs accessed by the malicious files; and packers used for packing of malicious file.

If the file is determined to be malicious by malware detection module 210, the malware repair module 240 retrieves from the local malware database 250 a malware remediation tool 252 associated with the detected malware. The remediation tool 252 may include a set of instructions, e.g., a script, for performing remedial actions, including but not limited to repairing the computer node (e.g., reversing effects of execution of the malicious file); removing or quarantining the malicious file from the computer node 110; changing infected files (removing the added section of the malicious file, if necessary with the modification of control transfer instructions in this section); decrypting encrypted files, finding and removing rootkits; changing the OS registry branches; removing services registered by the malware; blocking access to certain network addresses; closing the vulnerability by installing the appropriate patches. The malware repair module 240 uses the remediation tool 250 to perform one or more of the above-listed remedial actions on the computer node 110.

If the malware detection module 210 cannot conclusively determine whether an unknown file is clean or malicious, the statistics collection module 220 may be used to collect statistics characterizing the unknown file and/or its behavior. For example, during emulation 214 of the unknown file, the malware detection module 210 can generate a log of OS API function calls made by the unknown file. In another example, during the signature analysis 211, the malware detection module 210 can generate a signature of the unknown file. This information may be collected by the statistics collection module 220.

The communication module 230 may then be used to transmit to other computer nodes (e.g., nodes 120, 130, etc.), which have security clients deployed thereon, a request for information about the unknown file. In various aspects, transmitting may include broadcasting or multicasting the request on a local or remote computer network. The transmitted request for information may include, but not limited to, the identifiers of the unknown file, e.g., checksum of the file or part thereof, collected statistics about the unknown file and other information. When a security client 200 on another computer node (e.g., node 120) receives, via its communication module 230, such a request from computer node 110, the security client 200 on computer node 120 will check its local malware database 250 for information about the unknown file identified in the received request and/or analyze the received statistics using one or more available malware detection methods 211-214. If this file or a file having similar set of statistics found in the malware database 250 or have been confirmed as malicious via malware analysis, the computer node 120 will respond to computer node 110 with a confirmation that the file is in fact malicious, and, optionally, include associated malware information 251 and remediation tool 252.

When computer node 110 receives a response from one of the other compute nodes (e.g., node 120) with a confirmation that the unknown file is in fact malicious, associated malware information and remediation tool, the security client 200 may update its local malware database with received information about the malicious file and use received remediation tool 252 to remove the malicious file from the computer node 110 and, if necessary, repair the computer node 110. In one example aspect, the security client 200 of computer node 110 may also send to the security server 150 a checksum (e.g., MD5, SHA-0) of the malicious file or part thereof for confirmation that the file is in fact malicious or clean.

In one example aspect, when the computer node 110 receives responses to its request for information about unknown file from several computer nodes, the security client 200 may prioritize sources of information (i.e., computer nodes) from which it can download the requested information (e.g., malware statistics, remediation tools, etc.). Fox example, the security client 200 may select a "source" computer node that has the latest versions of the remediation tools for the give malicious file. In another example, the security client 200 may select a source computer node based on network proximity of the computer node 110 and the source computer node (e.g., a priority can be given to nodes located in the same local area network). In another example, the security client 200 may select a source computer node based on its geographical proximity of the selected source computer node to the origin of appearance of the malicious file. Yet in another example, the security client 200 may select a source computer node based on a bandwidth of a communication channel connecting the source computer node to a broadband network and computing power of the source computer node (e.g., a priority is given to nodes having greater bandwidth and more computing power). Yet in another example, the security client 200 may select a source computer node based on geopolitical reasons (e.g., a company exposed to infection, does not want to give this event publicity, even by requesting remediation tools from certain countries).

In another example aspect, when a security client 200 on the compute node 110 performs analysis of a malicious file and identifies some useful information, such as the location of the source of infection (e.g., URL of the malicious file) or any metadata of the malicious file at the time when the file has already been removed from the computer node 110, for example, when a malicious file deleted itself, the computer node 110 can transmit the collected metadata to other computer nodes (e.g., nodes 120-130), if it can help to obtain the sample of the file. For example if the URL from which this malicious file was first downloaded is not available in the region where computer node 110 is located, the node 110 may transmit to other computer nodes a command to download this file from the specified URL (e.g., if the URL of the form *. uk, these download command may be first sent to nodes geographically located in the United Kingdom). At the same time, the UK-based computer node that received the download command may check files contained in its local malware database and, if the desired file is found, send it to computer node 110. Alternatively, the UK-based computer node may download the file from the specified URL and send it to the computer node 110**.

Figure 3:
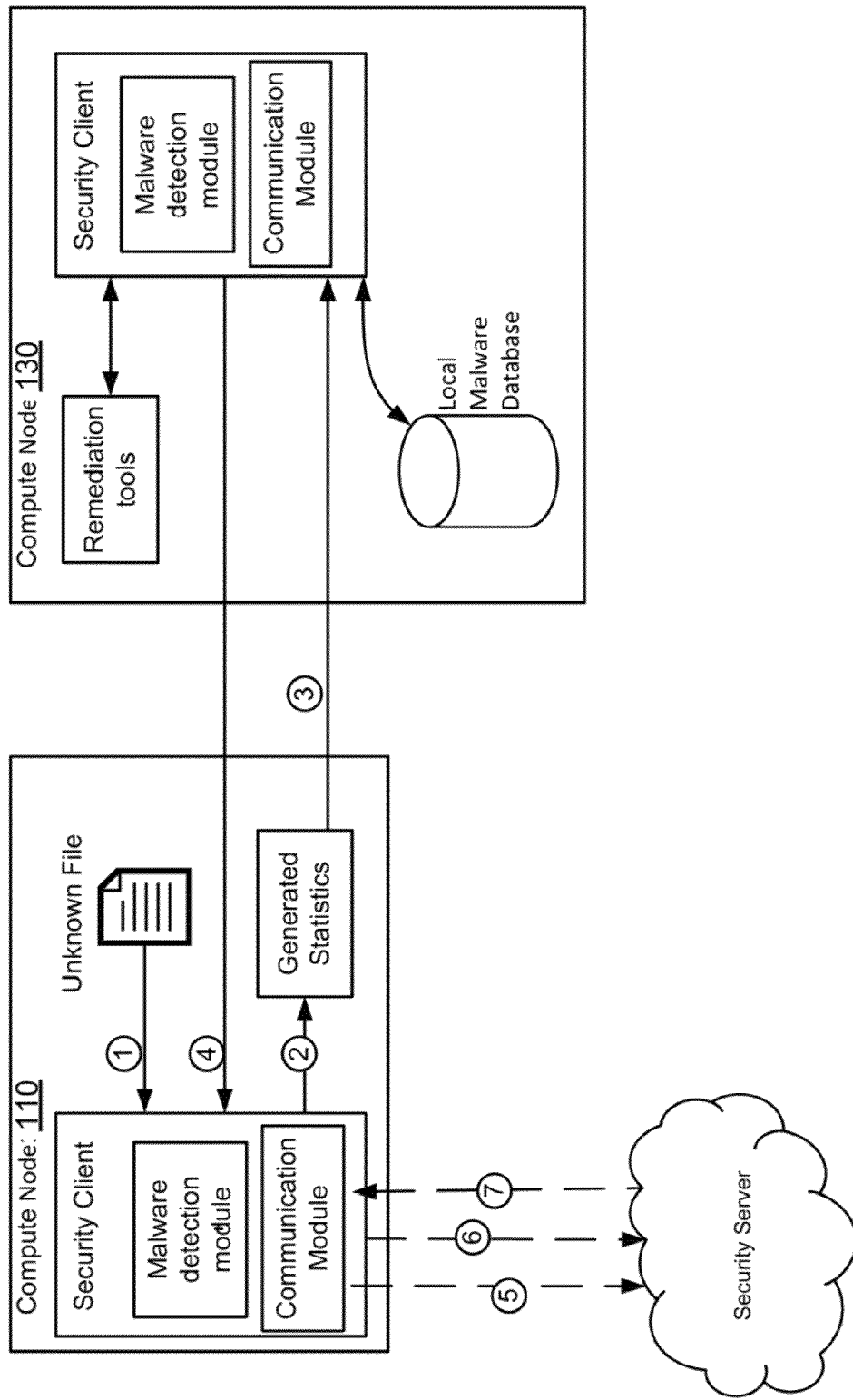
FIG. 3 shows a schematic diagram of operation of the system for distributed detection of malware according to one example aspect of the invention.

FIG. 3 shows a schematic diagram of operation of the system for distributed detection of malware according to one example aspect of the invention. During antivirus analysis of an unknown file on the computer node 110, at step 1, its security client 220 can generate, at step 2, a set of statistics characterizing the unknown file and/or its behavior. If the security client determines that the file is clean no other processing is needed of this file. If the security client determines that the file is malicious, the security client may generate a remediation tool 252 that performs remedial actions on the malicious file, such as repairing the infected file or removing the malicious file from the computer node 110. In addition, the security client may mark corresponding set of statistics as being associated with a malicious file, store them in a local malware database 250, and transmit them along with the remediation tool to other computer nodes 120-130 and (optionally) to the security server 150.

Generation of the remediation tool (both on the compute nodes 110-130 and on the server 150) can be performed automatically (or with assistance of a human malware expert). For example, the security client can analyze the generated file statistics for presence of patterns of malicious API function calls in the API function log of the malicious file, and generating a script for removing the changes made to the computer node due to calling these API functions by the malicious file. Thus, in one example aspect, the remediation tool may include information about the malicious file, some characteristic statistics of its behavior, and repair or removal instructions (e.g., script). The remediation tool may be transmitted in the form of a stand-alone file or program, or as an update for existing modules of the security client. The remediation tool is also associated with the malicious file, as well as the collected statistics.

If the security client on computer node 110 cannot conclusively classify the unknown file as either being clean or malicious using the applied malware analysis method(s), the security client can transmit, at step 3, to other computer nodes 120-130 (and optionally to the security server 150) a request to provide identification information and remediation tool(s) for the unknown file. The request may include the file identifier and collected statistics about the unknown file (or a checksum of the collected statistics or portion thereof). One or more of other computer nodes may have previously already encountered this unknown file, collected its statistics, and have determined the associated file to be either malicious or clean.

If the compute node (e.g., compute node 130) that received such a request message from the computer node 110 has previously collected statistics data on, for example, a similar file, which was once classified as malicious, the computer node 130 may, at step 4, send to computer node 110 a response confirming that the identified file is in fact malicious or clean, or that statistics identified in the request is associated with a known malicious or clean file. The security client 200 of computer node 110 may use received information to confirm that the unknown file is clean or malicious. In addition, compute node 130 may also send to computer node 110 a remediation tool that was once generated for this file based on associated set of statistics, which is similar to the one that was obtained by the compute node 110. The security client on computer node 110 may use received information and remediation tool to repair the computer node 110 and remove the malicious file.

If none of the computer nodes that received the request from the computer node 110 transmits a response with information about the unknown file or remediation tools, which may indicate that none of the other computer nodes have encountered this unknown file before, then, at step 5, compute node 110 may transmit a checksum of this file or part thereof to the security server 150. The server 150 will check this checksum in a more comprehensive database of malware (not shown) than any of the security clients deployed on computer nodes 110-130. If provided file checksums are insufficient to determine whether the file is clean or malicious, then at step 6, the computer node 110 may send to the security server 150, the unknown file itself for the detailed analysis of the file, which can be done using computationally intensive methods of analysis (e.g., using a pattern recognition algorithm or other data mining algorithms) and using expert analysis. If the file is determined to be malicious, then at step 7, the server 150 may send to the computer node 110, results of the malware analysis, as well as a generated malware remediation tool and a set of collected statistics about the malicious file.

Figure 4:
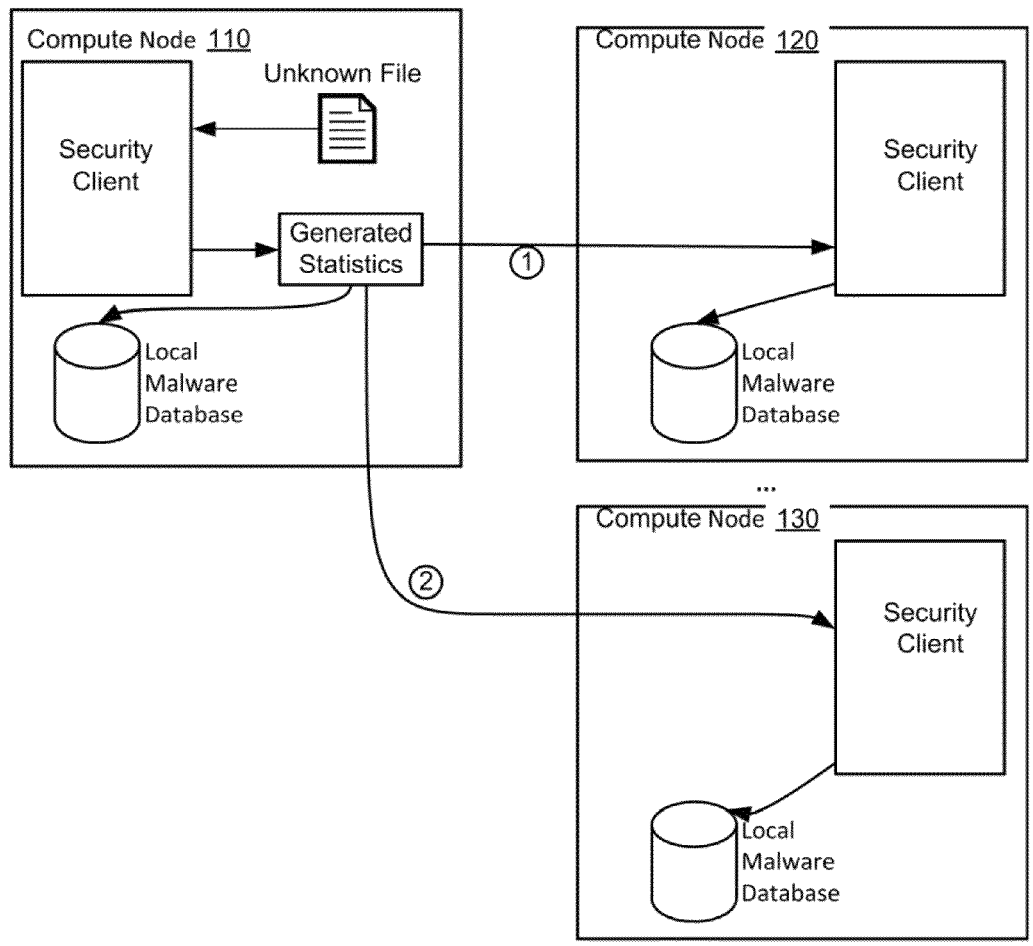
FIG. 4 shows a schematic diagram of operation of the system for distributed detection of malware according to another example aspect of the invention.

FIG. 4 shows another schematic diagram of operation of the system for distributed detection of malware according to another example aspect of the invention. In this aspect, as soon as compute node 110 obtains information about new malware (statistics on malicious file and/or associated remediation tools), either by analyzing a new malicious file using its own malware detection module 120, or by receiving this information from another computer node or server 150, the compute node 110 may transmit, at steps 1 and 2, this information (e.g., checksums of malicious files, associated statistics and remediation tools) to all other computer nodes (e.g., nodes 120 and 130) or a selected group of nodes, for future use. Therefore, the security client 200 on another computer node can now detect this malicious file much faster using, for example, the received file checksum, then it would having to perform a more time and resource consuming heuristic analysis of the same file using its heuristic detection module.

Figure 5:
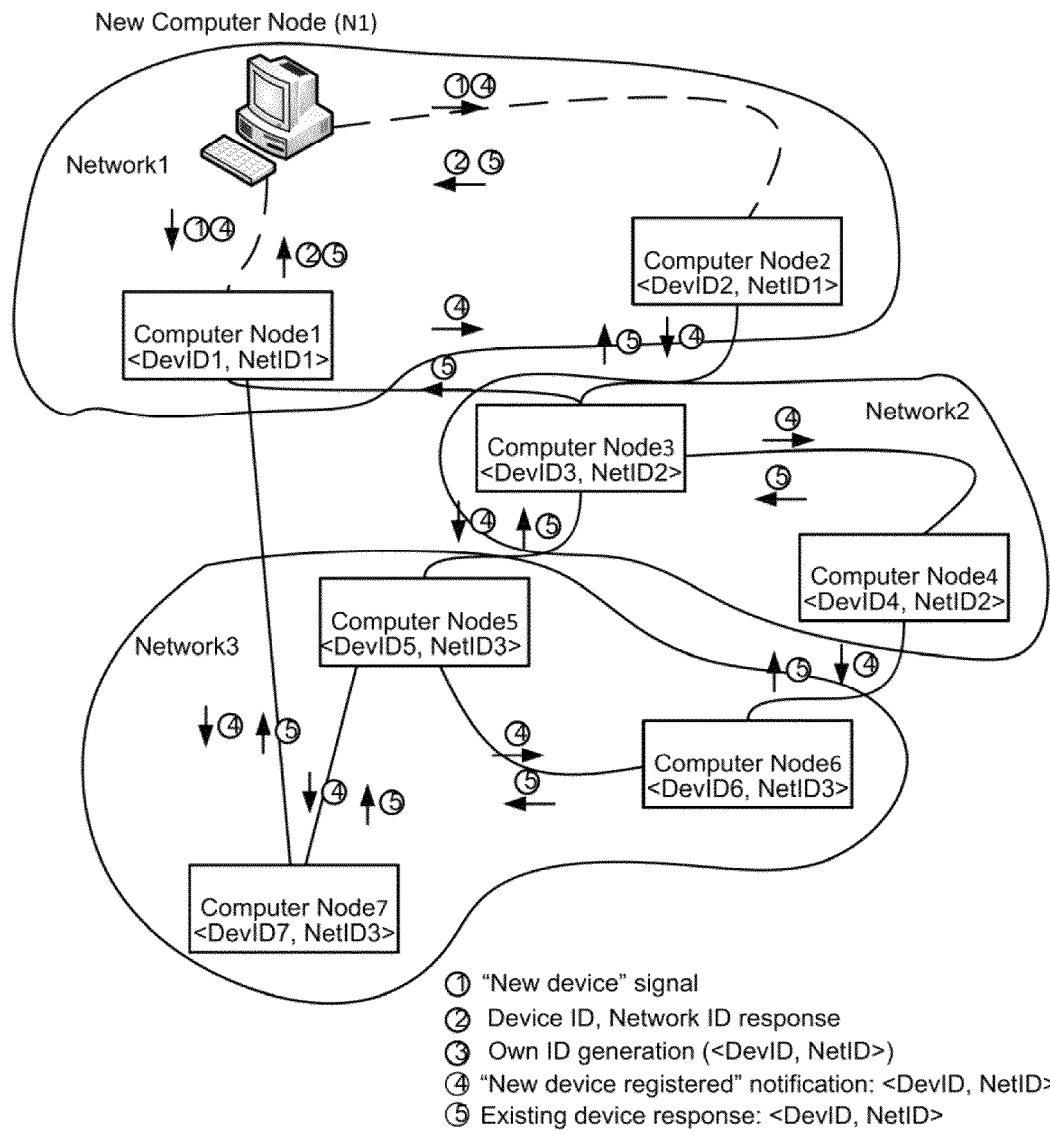
FIG. 5 shows a schematic diagram of communication between computer nodes for distributed detection of malware according to one example aspect of the invention.

FIG. 5 shows a schematic diagram of communication between computer nodes for distributed detection of malware according to one example aspect of the invention. Particularly, depicted a mechanism for adding a new computer node (N1) to the distributed network of computer nodes located in different networks. Initially, a security client is deployed on the computer node N1 located in Network1. For simplicity, the term Network# as used herein below includes one or more local or remote computer networks. At step 1, the computer node N1 transmits to its neighbors on Network1 (e.g., computer nodes 1 and 2) announcement of the activation of a new security client. At step 2, computer nodes on the same Network1 (e.g., computer nodes 1 and 2) will respond to the request with their own identification information, such as device ID (DevID) and network ID (NetID). At step 3, computer node N1, having received identifiers of its neighbors, generates its own identifier DevID, so that it does not coincide with the device IDs of its neighbors. Network ID (NetID) of the computer node N1 can be assigned or forced to be choose on the basis of rules (e.g., select NetID coinciding with NetID of your closest neighbor). The proximity metric for determination of the closest neighbor may be based on response time or number of hops between two computer nodes. At step 4, the computer node N1 transmits (e.g., broadcasts or multicasts) its newly created identifier <DevID, NetID> to all its neighbors, which in turn can spread this identifier to their own neighbors, which may be located in different, remote networks, such as Network2 and Network3. In other words, each computer node that receives an identifier of the new computer node N1 transmits this identifier to its own neighbors. For example, as depicted, computer node 1 sends, in step 4, the identifier of the new computer node N1 to its neighbor computer node 7 in Network3. At step 5, each computer node that receives identifier of the new computer node N1, responds by transmitting their own identifiers to the new computer node N1. For example, as depicted, computer node 7 may send to computer node N1 via computer node 1 its own identifier data. In this manner, each computer node that has a security client deployed thereon has a list of identifiers <DevID, NetID> of all other computer nodes located in its local or remote networks. The computer node can then use these identifiers to transmit requests for malware information to other computer nodes.

Figure 6:
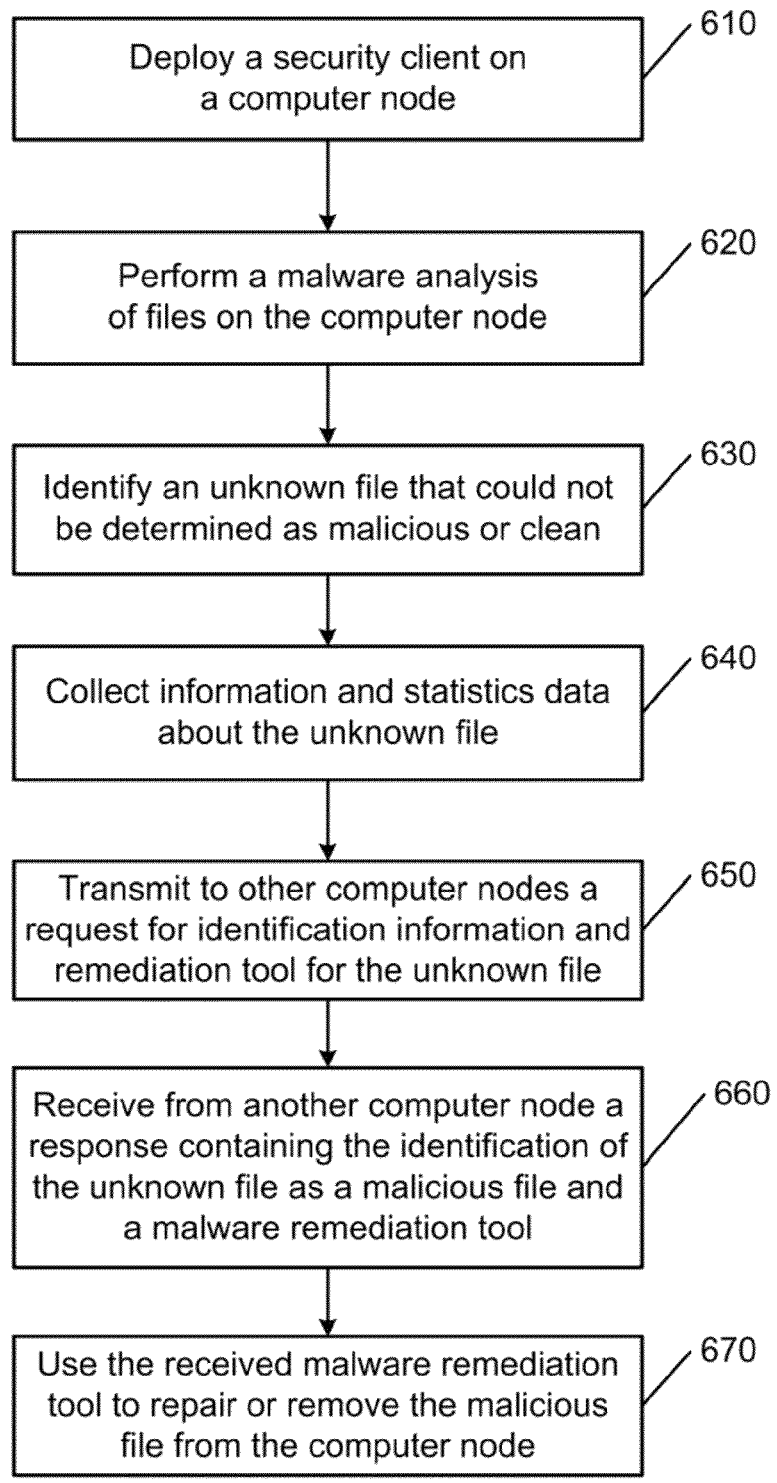
FIGS. 6-9 show example methods for distributed detection of malware according to one example aspect of the invention.

FIG. 6 shows an example method for distributed detection of malware according to one example aspect of the invention. At step 610, the method includes deploying a security client on computer node 110. The first security client is operable to identify and communicate with security clients deployed on other computer nodes, such as nodes 120, 130, etc., located in a local or remote computer network. At step 620, the method includes performing, by the security client, a malware analysis of files on the computer node 110. At step 630, the method includes identifying an unknown file that could not be determined as either malicious or clean. At step 640, the method includes collecting, by the security client, information and statistics data about the unknown file generated during malware analysis of the unknown file by the first security client. At step 650, the method includes transmitting, by the security client, to other computer nodes, a request for identification information and remediation tool for the unknown file. At step 660, the method includes receiving from at least one other computer node a response containing the identification of the unknown file as a malicious file and a malware remediation tool for the identified malicious file. The remediation tool includes information, statistics data and malware repair or removal instructions for the malicious file. At step 670, the method includes using, by the security client, the received identification and malware remediation tool to repair or remove the malicious file from the computer node.

Figure 7:
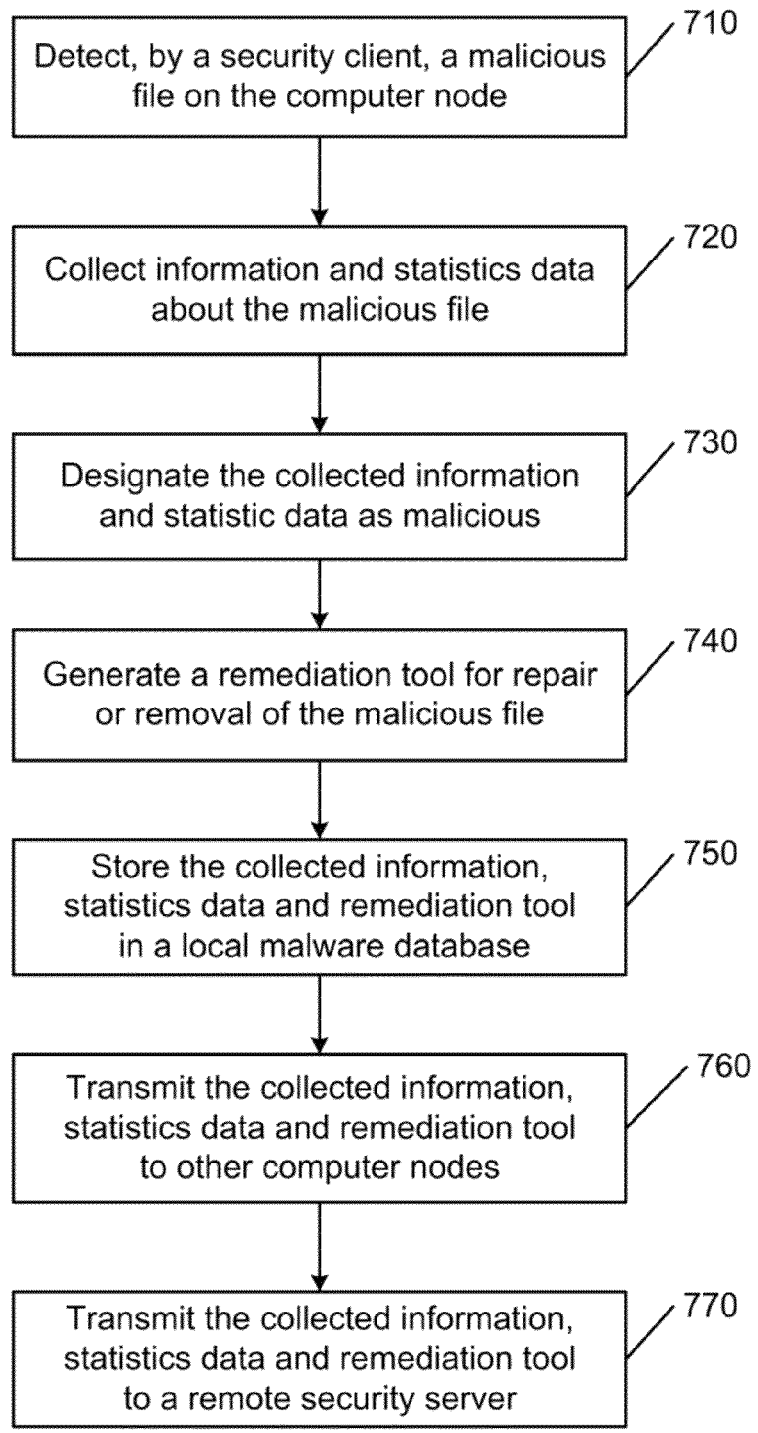

FIG. 7 shows an example method for distributed detection of malware according to one example aspect of the invention. At step 710, the method includes detecting, by a security client, a malicious file on a computer node 110. At step 720, the method includes collecting by the security client information and statistics data about the malicious file generated during malware analyses of the file by the security client. At step 730, the method includes designating the collected information and statistic data as malicious. At step 740, the method includes generating a remediation tool for repair or removal of the malicious file. At step 750, the method includes storing the collected information, statistics data and remediation tool for the malicious file in a local malware database on the computer node 110. At step 760, the method includes transmitting the collected information, statistics data and remediation tool to other computer nodes. At step 770, the method optionally includes transmitting the collected information, statistics data and remediation tool to a remote security server.

Figure 8:
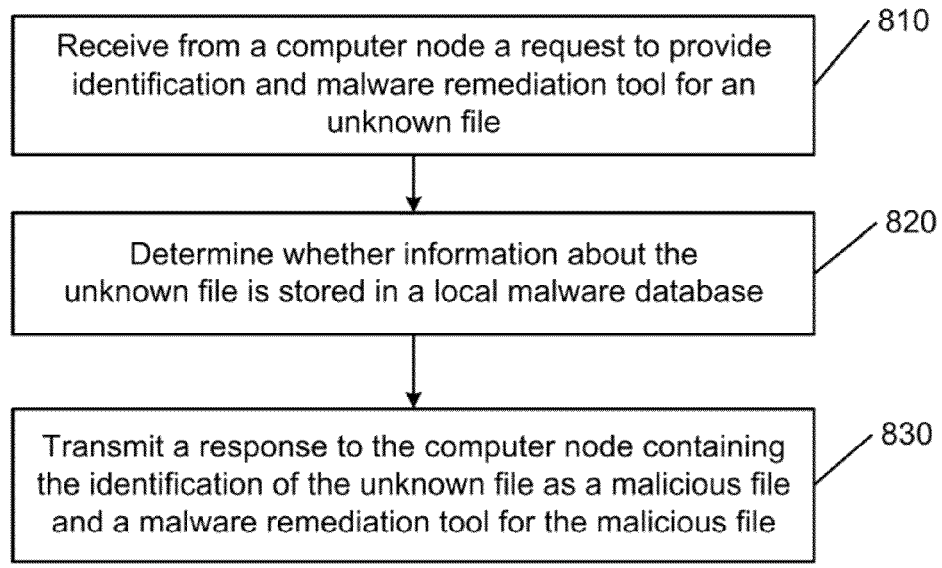

FIG. 8 shows an example method for distributed detection of malware according to one example aspect of the invention. At step 810, the method includes receiving from a security client deployed on a computer node, e.g., node 120, a request to provide identification and malware remediation tool for an unknown file. At step 820, the method includes determining, by a security client deployed on computer node 110, whether information about the unknown file is stored in a local malware database. At step 830, the method includes, if the information about the unknown file is stored in the local malware database, transmitting a response to the second security client containing the identification of the unknown file as a malicious file and a malware remediation tool for the identified malicious file.

Figure 9:
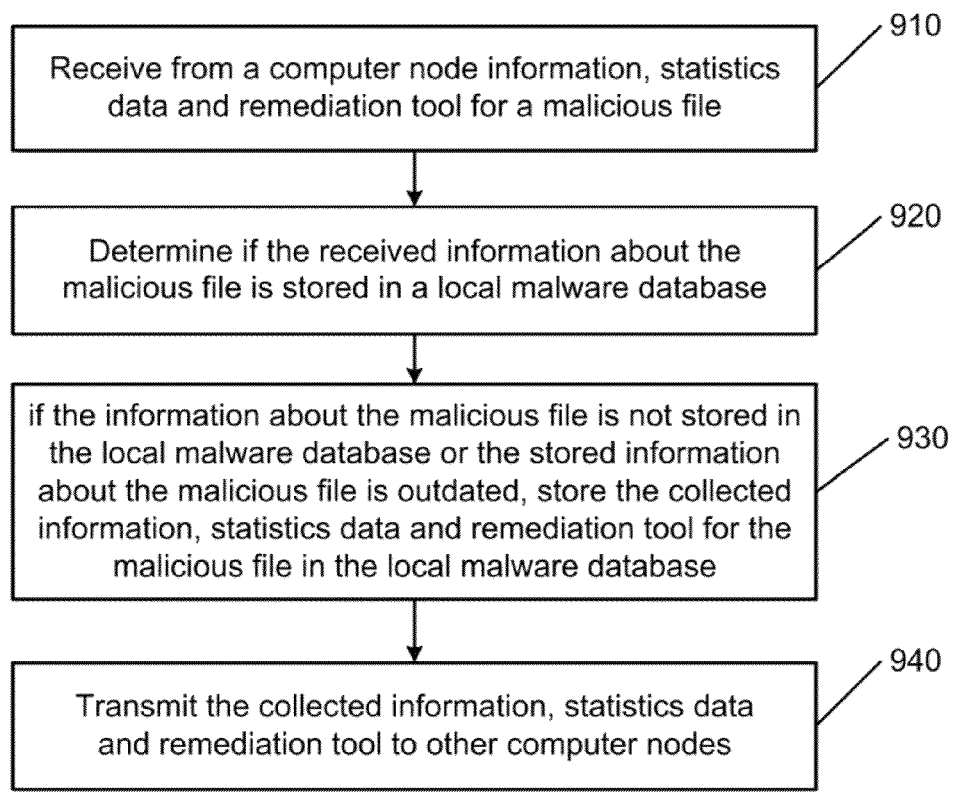

FIG. 9 shows an example method for distributed detection of malware according to one example aspect of the invention. At step 910, the method includes receiving from a security client deployed on computer node 120 information, statistics data and remediation tool for a malicious file. At step 920, the method includes determining, by the security client of computer node 110, if the received information about the malicious file is stored in a local malware database. At step 930, the method includes, if the information about the malicious file is not stored in the local malware database or the stored information about the malicious file is outdated, storing the collected information, statistics data and remediation tool for the malicious file in the local malware database. At step 940, the method includes transmitting the collected information, statistics data and remediation tool to security clients deployed on other computer nodes.

Figure 10:
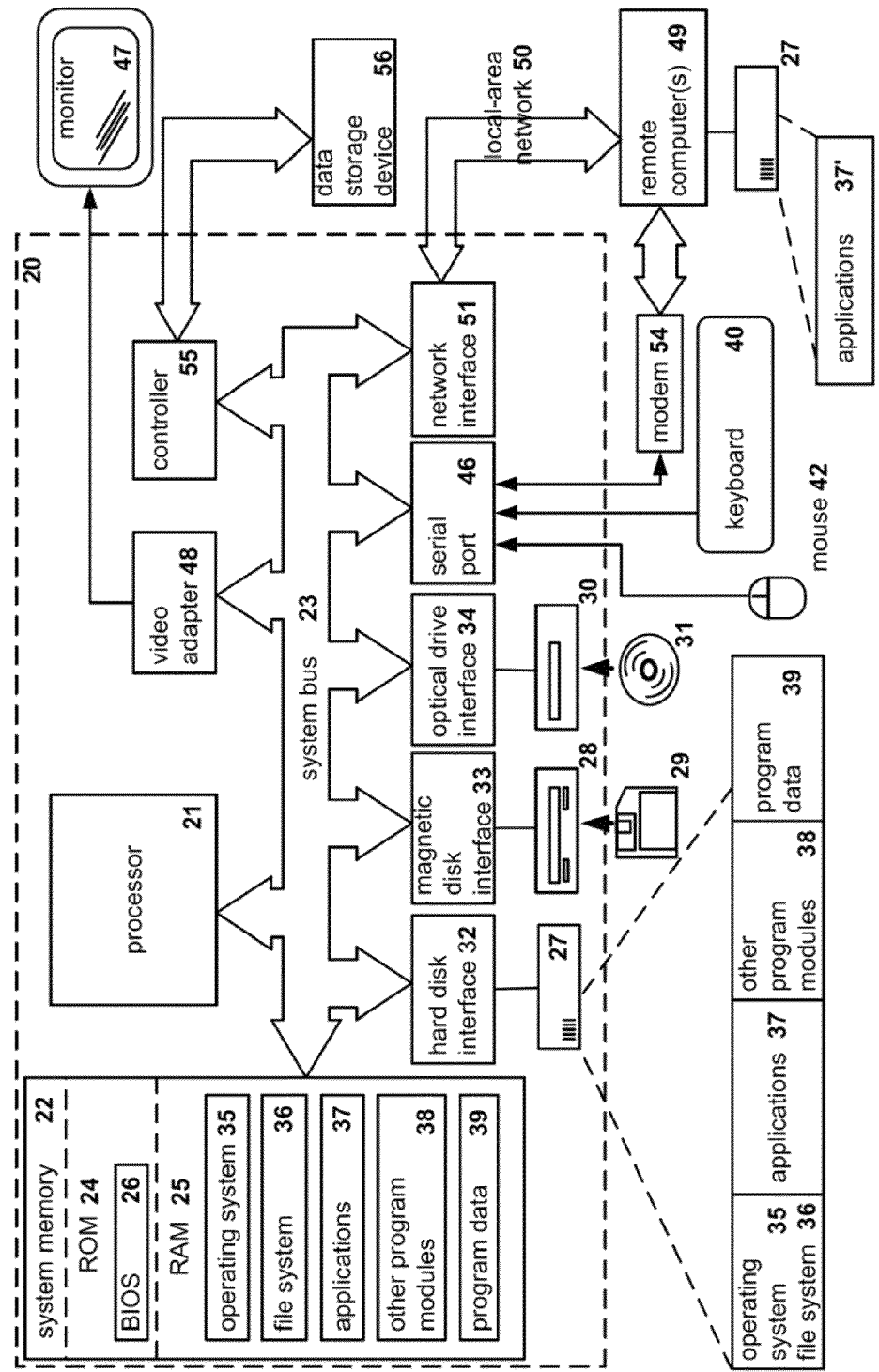
FIG. 10 shows an example of a general-purposes computer system, such as a personal computer or a server, suitable for implementing the disclosed aspects of systems and method for distributed detection of malware according to one example aspect of the invention.

FIG. 10 shows an example of a general-purpose computer system 20, which may be used to implement the computer node (of FIG. 1) of the systems and methods for distributed detection of malware disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the computer 20, such as those at the time of loading the operating system with the use of the ROM 24.

The computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer 20.

The computer 20 may include one or more hard disk drives 27, removable magnetic disks 29 and removable optical disks 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The computer 20 is able to work in a network environment, using a network connection to one or more remote computers 49. The remote computer (or computers) 49 may also be personal computers or servers having the majority or all of the aforementioned elements in describing the nature of the computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the computer 20 is connected to the local-area network 50 across a network adapter or network interface 51. When networks are used, the computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of distributed detection of malware, the method comprising:

deploying a first security client on a first client computer, wherein the first security client is operable to identify and communicate with a plurality of second security clients deployed on respective second client computers;

performing, by a hardware processor of the first client computer executing the first security client, a malware analysis of files on the first client computer;

identifying metadata of an unknown file that could not be determined as either malicious or clean by the malware analysis;

collecting, by the hardware processor executing the first security client, the metadata of the unknown file identified during the malware analysis of the unknown file by the first security client;

multicasting, by the hardware processor executing the first security client, to the plurality of second client computers, a request that includes the metadata of the unknown file and a remediation tool for the unknown file;

receiving responses from at least two of the plurality of second client computers, where the responses contain information relating to the unknown file;

selecting, by the hardware processor of the first client computer, one of the at least two second client computers as a source client computer;

receiving, from the source client computer, a copy of the unknown file, an identification of the unknown file as a malicious file and the malware remediation tool for the identified malicious file, wherein the remediation tool includes information, statistics data and malware repair or removal instructions for the malicious file;

updating a local malware database on the first client computer with the identification of the unknown file as the malicious file and the malware remediation tool; and using, by the hardware processor executing the first security client, the malware remediation tool to repair the first client computer.

2. The method of claim 1, wherein the malware analysis includes at least of a signature analysis, heuristic analysis, proactive analysis and emulation.

3. The method of claim 1, further comprising:
detecting, by the hardware processor executing the first security client, a malicious file on the first client computer;

collecting by the hardware processor executing the first security client information and statistics data about the malicious file generated during malware analyses of the file by the first security client;

designating the collected information and statistic data as malicious;

generating a remediation tool for repair or removal of the malicious file;

storing the collected information, statistics data and remediation tool for the malicious file in the local malware database on the first computer node;

transmitting the collected information, statistics data and remediation tool to one or more of the second client computers; and transmitting the collected information, statistics data and remediation tool to a remote security server.

4. The method of claim 1, further comprising:
receiving from a second security client deployed on a second computer node a request to provide an identification and malware remediation tool for an unknown file;

determining, by the hardware processor executing the first security client, whether information about the unknown file is stored in the local malware database on the first computer node;

if the information about the unknown file is stored in the local malware database, transmitting a response to the second security client containing the identification of the unknown file as a malicious file and a malware remediation tool for the identified malicious file.

5. The method of claim 1, further comprising:
receiving from a second security client deployed on one of the second client computers information, statistics data and remediation tool for a malicious file;

determining, by the hardware processor executing the first security client, if the received information about the malicious file is stored in the local malware database on the first client computer;

if the information about the malicious file is not stored in the local malware database or the stored information about the malicious file is outdated, storing the collected information, statistics data and remediation tool for the malicious file in the local malware database; and transmitting the collected information, statistics data and remediation tool to one or more second security clients deployed on one or more of the second client computers.

6. The method of claim 1, further comprising:
determining, by the hardware processor executing the first security client, whether the requested identification and malware remediation tool have been received from any of the second client computers; and when the requested identification and malware remediation tool have not been received from any of the second client computers, transmitting to a remote security server a request for identification information and remediation tool for the malicious file.

7. The method of claim 1, further comprising:
determining, by the hardware processor executing the first security client, whether the malicious file has been repaired or removed using the received identification and malware remediation tool; and when the malicious file has not been repaired or removed using the received identification and malware remediation tool, transmitting to a remote security server a request for identification information and remediation tool for the malicious file.

8. The method of claim 1, wherein the selecting, by the hardware processor executing the first security client, of the source client computer is based on a network proximity of the selected source client computer to the first client computer.

9. The method of claim 1, wherein the selecting, by the hardware processor executing the first security client, of the source client computer is based on a geographic proximity of the selected source client computer to an origin of the malicious file.

10. The method of claim 1, wherein the selecting, by the hardware processor executing the first security client, of the source client computer is based on a bandwidth of a communication channel connecting the source client computer to a broadband network and computing power of the source client computer.

11. A system of distributed detection of malware, the system comprising:
a first client computer having hardware processor configured to execute a first security client stored on memory of the first client computer, wherein the first security client is operable to identify and communicate with a plurality of second security clients deployed on respective second client computers, and wherein, when executed by the hardware processor, the first security client causes the hardware processor to:

perform a malware analysis of files on the first client computer;
identify identifying metadata of an unknown file that could not be determined as either malicious or clean by the malware analysis;
collect the metadata of the unknown file identified during the malware analysis of the unknown file by the first security client;
multicast to the plurality of second client computers, a request that includes the metadata of the unknown file and a remediation tool for the unknown file;
receive responses from at least two of the plurality of second client computers, where the responses contain information relating to the unknown file;
select one of the at least two second client computers as a source client computer;
receive, from the source client computer, a copy of the unknown file, an identification of the unknown file as a malicious file and the malware remediation tool for the identified malicious file, wherein the remediation tool includes information, statistics data and malware repair or removal instructions for the malicious file;
update a local malware database on the first client computer with the identification of the unknown file as the malicious file and the malware remediation tool; and
use the malware remediation tool to repair the first client computer.

12. The system of claim 11, wherein the malware analysis includes at least of a signature analysis, heuristic analysis, proactive analysis and emulation.

13. The system of claim 11, wherein, when executed by the hardware processor, the first security client further causes the hardware processor to:
detect a malicious file on the first client computer;
collect information and statistics data about the malicious file generated during malware analyses of the file by the first security client;
designate the collected information and statistic data as malicious;
generate a remediation tool for repair or removal of the malicious file;
store the collected information, statistics data and remediation tool for the malicious file in the local malware database on the first client computer;
transmit the collected information, statistics data and remediation tool to one or more second client computers; and
transmit the collected information, statistics data and remediation tool to a remote security server.

14. The system of claim 11, wherein, when executed by the hardware processor, the first security client further causes the hardware processor to:
receive from a second security client deployed on a second client computer a request to provide an identification and malware remediation tool for an unknown file;
determine whether information about the unknown file is stored in the local malware database on the first client computer; and
if the information about the unknown file is stored in the local malware database, transmit a response to the second security client containing the identification of the unknown file as a malicious file and a malware remediation tool for the identified malicious file.

15. The system of claim 11, wherein, when executed by the hardware processor, the first security client further causes the hardware processor to:
receive from a second security client deployed on a second client computer information, statistics data and remediation tool for a malicious file;
determine if the received information about the malicious file is stored in the local malware database on the first client computer;
if the information about the malicious file is not stored in the local malware database or the stored information about the malicious file is outdated, store the collected information, statistics data and remediation tool for the malicious file in the local malware database; and
transmit the collected information, statistics data and remediation tool to one or more second security clients deployed on one or more second client computers.

16. The system of claim 11, wherein, when executed by the hardware processor, the first security client further causes the hardware processor to:
determine, whether the requested identification and malware remediation tool have been received from any of the second client computers; and
when the requested identification and malware remediation tool have not been received from any of the second client computers, transmit to a remote security server a request for identification information and remediation tool for the malicious file.

17. The system of claim 11, wherein, when executed by the hardware processor, the first security client further causes the hardware processor to:
determine whether the malicious file has been repaired or removed using the received identification and malware remediation tool; and
when the malicious file has not been repaired or removed using the received identification and malware remediation tool, transmit to a remote security server a request for identification information and remediation tool for the malicious file.

18. The system of claim 11, wherein, when executed by the hardware processor, the first security client further causes the hardware processor to select the source client computer based on network proximity of the selected source client computer to the first client computer.

19. The system of claim 11, wherein, when executed by the hardware processor, the first security client further causes the hardware processor to select the source client computer based on a geographic proximity of the selected source client computer to an origin of the malicious file.

20. The system of claim 11, wherein, when executed by the hardware processor, the first security client further causes the hardware processor to select the source client computer based on a bandwidth of a communication channel connecting the second client computer to a broadband network and computing power of the source client computer.

21. A non-transitory computer readable medium comprising computer executable instructions for distributed detection of malware, the instructions comprising:
deploying a first security client on a first client computer, wherein the first security client is operable to identify and communicate with a plurality of second security clients deployed on respective second client computers;
performing, by a hardware processor of the first client computer executing the first security client, a malware analysis of files on the first client computer;
identifying metadata of an unknown file that could not be determined as either malicious or clean by the malware analysis;

collecting, by the hardware processor executing the first security client, the metadata of the unknown file identified during the malware analysis of the unknown file by the first security client;

multicasting, by the hardware processor executing the first security client, to the plurality of second client computers, a request that includes the metadata of the unknown file and a remediation tool for the unknown file;

receiving responses from at least two of the plurality of second client computers, where the responses contain information relating to the unknown file;

selecting, by the hardware processor of the first client computer, one of the at least two second client computers as a source client computer;

receiving, from the source client computer, a copy of the unknown file, an identification of the unknown file as a malicious file and the malware remediation tool for the identified malicious file, wherein the remediation tool includes information, statistics data and malware repair or removal instructions for the malicious file;

updating a local malware database on the first client computer with the identification of the unknown file as the malicious file and the malware remediation tool; and using, by the hardware processor executing the first security client, the malware remediation tool to repair the first client computer.

* * * * *